United States Patent
Potter

(10) Patent No.: US 9,671,259 B2
(45) Date of Patent: Jun. 6, 2017

(54) CONDUIT

(71) Applicant: BAE SYSTEMS PLC, London (GB)

(72) Inventor: Mark Alfred Potter, Preston Lancanshire (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/035,005

(22) PCT Filed: Nov. 3, 2014

(86) PCT No.: PCT/EP2014/073591
§ 371 (c)(1),
(2) Date: May 6, 2016

(87) PCT Pub. No.: WO2015/067564
PCT Pub. Date: May 14, 2015

(65) Prior Publication Data
US 2016/0258792 A1    Sep. 8, 2016

(30) Foreign Application Priority Data

Nov. 6, 2013 (EP) .................................... 13275280
Nov. 6, 2013 (GB) .................................. 1319586.2

(51) Int. Cl.
*G01F 1/46* (2006.01)
*G01L 19/00* (2006.01)

(52) U.S. Cl.
CPC ............ *G01F 1/46* (2013.01); *G01L 19/0023* (2013.01)

(58) Field of Classification Search
CPC ...................................... G01F 1/44; G01F 1/46
(Continued)

(56) References Cited

U.S. PATENT DOCUMENTS 3,727,459 A * 4/1973 Buettner ................. G01F 1/203
73/227
4,957,007 A    9/1990 Gray
(Continued)

FOREIGN PATENT DOCUMENTS

JP    H11211525 A    8/1998
WO    9810249 A1    3/1998

OTHER PUBLICATIONS

EP Search Report for EP Application No. 13275280.9, dated May 8, 2014, 7 pages.
(Continued)

*Primary Examiner* — Jewel V Thompson
(74) *Attorney, Agent, or Firm* — Maine Cernota & Rardin

(57) ABSTRACT

Disclosed is a conduit (4) comprising a conduit wall defining a flow channel through which a fluid may flow and a plurality of further channels (24) through at least part of the conduit wall. Each further channel (24) comprises a first end (20) and a second end (22). The first ends (20) of the further channels (24) are spaced apart along a length of the conduit (4) and comprise openings in fluid communication with the flow channel of the conduit (4). The second ends (22) of the further channels (24) are located proximate to one another (e.g. substantially collocated) such that the distance between the second ends (22) of any two further channels (24) is smaller than the distance between the first ends (20) of those two further channels (24). Pressure sensors (26) may be coupled to the second ends (22) of the further channels, which may be closed.

17 Claims, 5 Drawing Sheets

(58) Field of Classification Search
USPC .......................... 73/861.66, 861.65, 861.63
See application file for complete search history.

(56) References Cited

U.S. PATENT DOCUMENTS

| | | |
|---|---|---|
| 6,886,413 B1 | 5/2005 | Chang et al. |
| 8,911,686 B2 * | 12/2014 | Macchi ................ G01N 1/4077 422/534 |
| 2006/0060001 A1 | 3/2006 | Kurtz et al. |
| 2007/0220987 A1 | 9/2007 | Clifton et al. |
| 2010/0305881 A1 | 12/2010 | Atkinson et al. |
| 2013/0008264 A1 | 1/2013 | McDaniel et al. |

OTHER PUBLICATIONS

GB Search Report for GB 1319586.2, dated Aug. 28, 2014, 3 pages.
International Preliminary Report on Patentabilty for PCT/EP2014/073591, dated Feb. 15, 2016, 5 pages.
Partial PCT Search Report for PCT/EP2014/073591, dated Feb. 5, 2015, 6 pages.
PCT Search Report for PCT/EP2014-073591, dated Jan. 29, 2015.

* cited by examiner

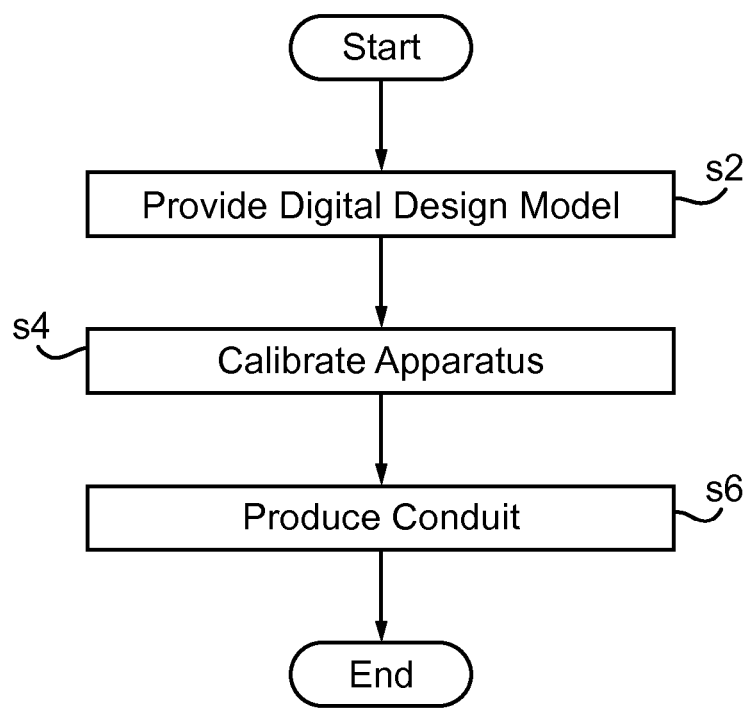

CONDUIT

RELATED APPLICATIONS

This application is a national phase application filed under 35 USC §371 of PCT Application No. PCT/EP2014/073591 with an International filing date of Nov. 3, 2014 which claims priority of GB Patent Application 1319586.2 filed Nov. 6, 2013 and EP Patent Application 13275280.9 filed Nov. 6, 2013. Each of these applications is herein incorporated by reference in its entirety for all purposes.

FIELD OF THE INVENTION

The present invention relates to conduits for conveying fluids and the production thereof.

BACKGROUND

Many techniques have been developed for the measurement of pressure of fluids being conveying in conduits and pipes. For example, pressure sensors may be arranged inside a conduit in a spaced apart relationship along the length of that conduit. This enables fluid pressure to be measured at different points along the length of a conduit. However, in such cases, the pressure sensors tend to be difficult to access, for example, if those pressure sensors have to be inspected or replaced etc.

In a separate field, Additive Manufacturing (AM) (also known as Additive Layer Manufacture (ALM), 3D printing, etc.) is a process that may be used to produce functional, complex objects, layer by layer, without moulds or dies. Typically, such processes include providing material (e.g. metal or plastic) in the form of a powder or a wire, and, using a powerful heat source such as a laser beam, electron beam or an electric, or plasma welding arc, melting an amount of that material and depositing the melted material (e.g. on a base plate of a work piece). Subsequent layers are then built up upon each preceding layer.

Example AM processes include, but are not limited to, Laser Blown Powder, Laser Powder Bed, and Wire and Arc technologies.

SUMMARY OF THE INVENTION

In a first aspect, the present invention provides a conduit comprising a conduit wall defining a flow channel through which a fluid may flow, and a plurality of further channels through at least part of the conduit wall. Thus, the further channels may be defined by the conduit wall, and may be formed within the conduit wall (for example, wholly or entirely within the conduit wall). Each further channel comprises a first end and a second end opposite to the first end. For each further channel, the first end of that further channel comprises an opening in fluid communication with the flow channel of the conduit. The first ends of the further channels are spaced apart along a length of the conduit. The second ends of the further channels are located proximate to one another such that the distance between the second ends of any two further channels is smaller than the distance between the first ends of those two further channels.

In some aspects, at least part of at least one further channel that is formed within the conduit wall runs longitudinally along at least part of the length of the conduit wall. In other words, for at least one further channel, a component of the direction in which that further channel travels, points along the length of the conduit wall. Thus, in some aspects, for at least one further channel located within the conduit wall, that further channel is not perpendicular to the length (or longitudinal axis) of the conduit wall. Preferably, at least part of more than one of the further channels run longitudinally within the conduit wall along at least part of the length of the conduit wall.

A part of a further channel within the conduit wall that runs longitudinally along at least part of the length of the conduit wall may be substantially parallel with the flow channel defined by the conduit wall. A part of a further channel within the conduit wall that runs longitudinally along at least part of the length of the conduit wall may be substantially aligned along a longitudinal axis of the conduit.

Having the further channels formed within the conduit walls tends to reduce a need for additional tubes/pipes external and/or internal to the conduit wall, thereby reducing size and weight of a system in which the conduit is implemented. Furthermore, many assembly operations may be avoided.

The opening of one or more of the further channels may be arranged such that, when a fluid flows through the flow channel of the conduit, that opening is directed upstream.

The opening of one or more of the further channels may be arranged such that, when a fluid flows through the flow channel of the conduit, that opening is a static port in communication with the fluid in a relatively undisturbed area.

The conduit may comprise one or more elongate portions extending from an internal surface of the conduit wall into the flow channel of the conduit. For each elongate portion, an opening of one or more of the further channels may be located at or proximate to a distal end of that elongate portion.

At least one of the elongate members may comprise at least two openings at or proximate to its distal end, a first of these openings being arranged such that, when a fluid flows through the flow channel of the conduit, that opening is directed upstream, and a second of these openings being arranged such that, when a fluid flows through the flow channel of the conduit, that opening is a static port in communication with the fluid in a relatively undisturbed area.

The second ends of the further channels may be closed ends.

The conduit may further comprise a plurality of pressure sensors. Each pressure sensor may be coupled to a respective further channel at the second end of that further channel. Each pressure sensor may be configured to measure a pressure in the further channel to which that pressure sensor is coupled.

The second ends of the further channels may be substantially co-located. This facilitates the connection of pressure measuring apparatus to the second ends of the further channels.

The conduit may be a single item having been produced using an Additive Manufacturing process.

Additive manufacturing techniques may be applied to the conduit. This use of additive manufacturing provides that increased complexity of components does not add to manufacturing costs. The use of an additive process enables the use of more complex geometries in the conduit, such as the further channel formed within the wall of the conduit. The additive manufacturing process advantageously produces the conduit as a single piece, thereby eliminating at least some assembly operations and maintenance of tools. The additive manufacturing process advantageously provides an alternative to brazing intense assemblies by providing the ability to manufacture complex monolithic structures.

In a further aspect, the present invention provides an aircraft comprising a first aircraft system, a second aircraft system, and a conduit arranged to couple the first aircraft system to the second aircraft system such that a fluid may be caused to flow from the first aircraft system to the second aircraft system through the conduit. The conduit may be in accordance with the first aspect.

The second ends of the further channels may be located at or proximate to an access panel of the aircraft.

In a further aspect, the present invention provides a method of producing a conduit, the conduit being in accordance with the first aspect, the method comprising producing a digital model of the conduit, and, using the digital model of the conduit, controlling an Additive Manufacturing apparatus to perform an Additive Manufacturing process to produce the conduit as specified by the digital model.

In a further aspect, the present invention provides a method of measuring fluid pressure comprising: providing a first system; providing a second system; coupling a conduit between the first system and the second system, the conduit being in accordance with the first aspect; causing a fluid to flow through the flow channel of the conduit from the first system to the second system; and measuring a pressure within a further channel of the conduit.

The second ends of the further channels may be closed ends and the step of measuring may be performed by a plurality of pressure sensors, each pressure sensor being coupled to a respective further channel at the second end of that further channel, and each pressure sensor being configured to measure a pressure in the further channel to which that pressure sensor is coupled.

The first and second systems may be aircraft systems located onboard an aircraft. The conduit may also be located onboard the aircraft.

BRIEF DESCRIPTION OF THE DRAWINGS

FIG. 5 is a process flow chart showing certain steps in an embodiment of a process of producing the conduit.

DETAILED DESCRIPTION

The terminology "Additive Manufacturing" is used herein to refer to all additive processes that may be used to produce functional, complex objects, layer by layer, without moulds or dies e.g. by providing material (e.g. metal or plastic) typically in the form of a powder or a wire, and, using a powerful heat source such as a laser beam, electron beam or an electric, or plasma welding arc, melting an amount of that material and depositing the melted material (e.g. on a base plate/work piece), and subsequently building layers of material upon each preceding layer.

Additive Manufacture (AM) may also be known inter alia as 3D printing, Direct Digital Manufacturing (DDM), Digital Manufacturing (DM), Additive Layer Manufacturing (ALM), Rapid Manufacturing (RM), Laser Engineering Net Shaping (LENS), Direct Metal Deposition, Direct Manufacturing, Electron Beam Melting, Laser Melting, Freeform Fabrication, Laser Cladding, Direct Metal Laser Sintering.

Figure 1:
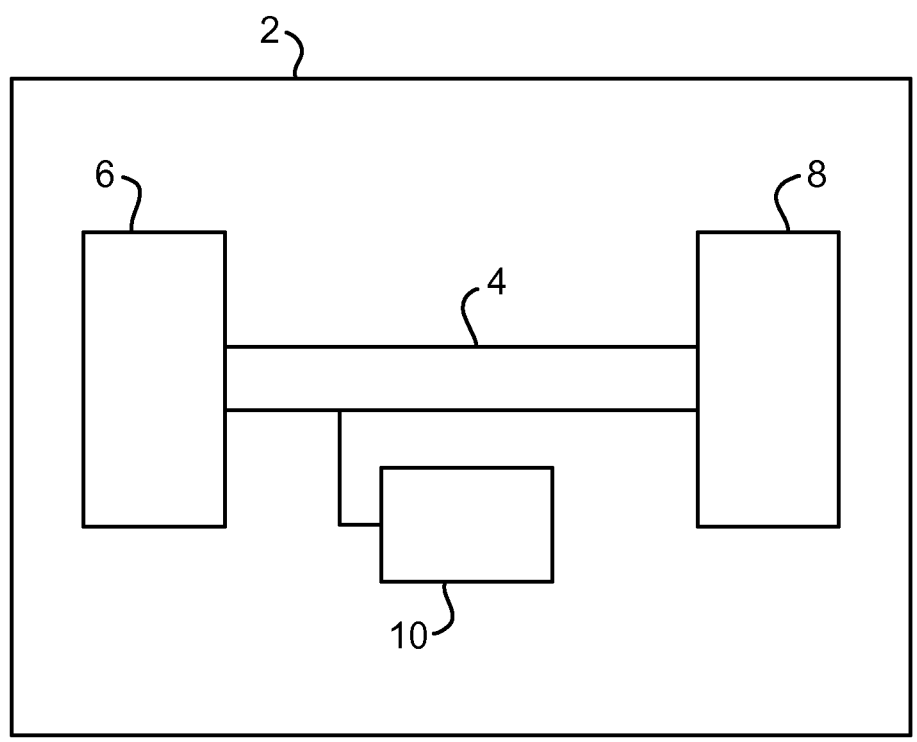
FIG. 1 is a schematic illustration (not to scale) of an example aircraft.

FIG. 1 is a schematic illustration (not to scale) of an example aircraft 2 in which an embodiment of a conduit 4 is implemented.

In this embodiment, the aircraft 2 comprises a first system 6 and a second system 8. The first system 6 and the second system 8 are coupled together via the conduit 4. In this embodiment, a fluid (e.g. a gas such as air, or a liquid such as liquid coolant) flows from the first system 6 to the second system 8 through the conduit 4. Thus, in this embodiment, the conduit 4 is a transport conduit or transport pipe for conveying fluid from one location to a different location.

In this embodiment, the conduit 4 is coupled to pressure measuring apparatus 10. As described in more detail later below with reference to FIG. 2, the pressure measuring apparatus 10 is configured to measure the stagnation pressure of the fluid within the conduit 4 at multiple points along the length of the conduit 4.

Figure 2:
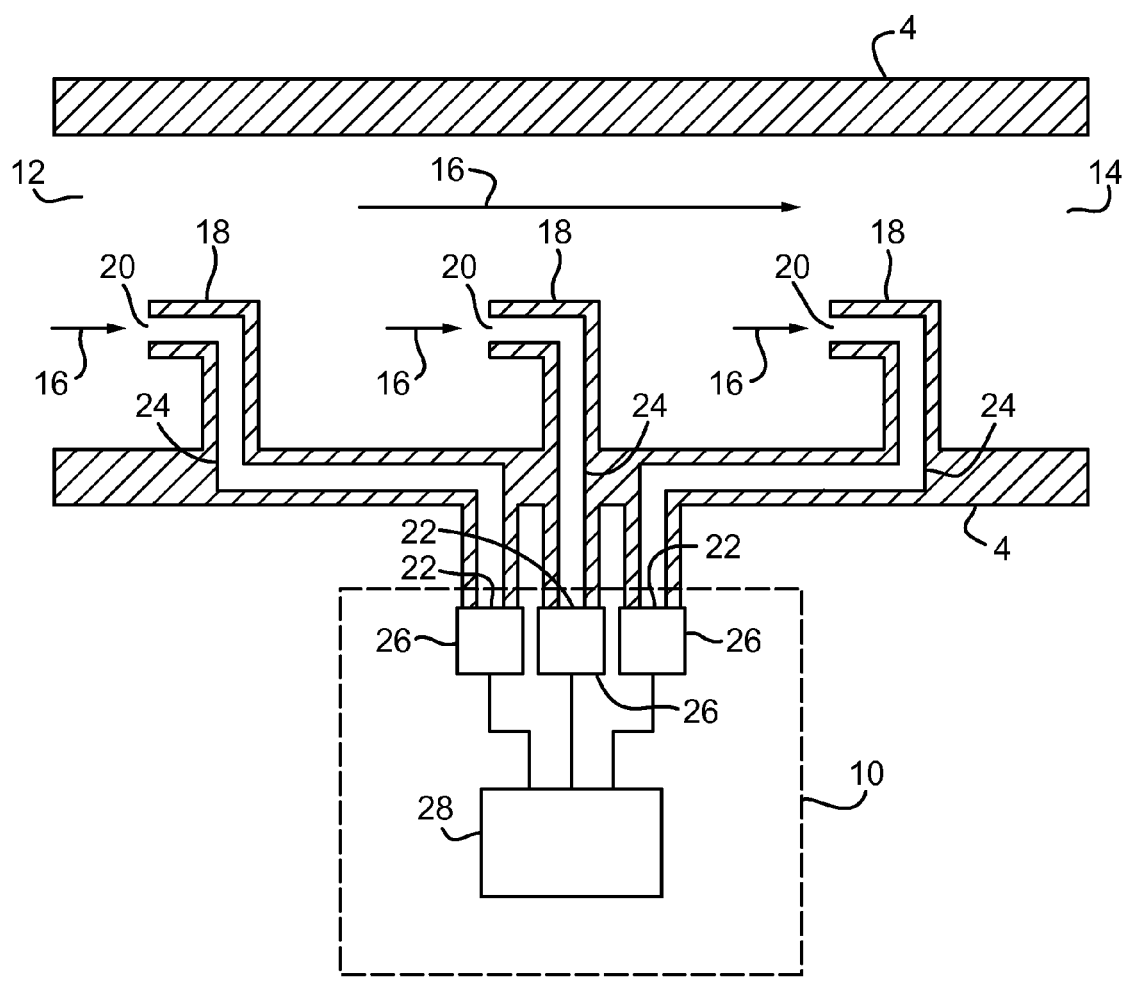
FIG. 2 is a schematic illustration (not to scale) showing a cross section of a conduit and a pressure measuring apparatus.

FIG. 2 is a schematic illustration (not to scale) showing a cross section of the conduit 4 and the pressure measuring apparatus 10 coupled to the conduit 4.

In this embodiment, the conduit 4 is made of titanium alloy. However, in other embodiments the conduit 4 is made of one or more different materials instead of or in addition to titanium alloy, for example, steel, a nickel-based alloy, aluminium alloy, or copper.

In this embodiment, the conduit 4 is a tubular pipe having a first end 12 and a second end 14. The first system 6 is coupled to the first end 12 of the conduit 4. The second system 8 is coupled to the second end 14 of the conduit 4.

In this embodiment, a fluid flows through the conduit 4 from the first end 12 to the second end 14. The direction of the fluid flow is indicated in FIG. 2 by solid arrows and the reference numeral 16.

In this embodiment, the conduit 4 comprises a plurality of tubes 18, and furthermore in this embodiment the plurality of tubes provide/are employed as integral pitot tubes 18. The pitot tubes 18 are integral with the wall of the conduit 4. For ease of illustration, in FIG. 2, the conduit 4 is shown as comprising three pitot tubes 18. However, it will be understood by the skilled person that the conduit 4 may include a different number of spaced apart pitot tubes 18.

In this embodiment, each pitot tube 18 comprises an open end 20 (i.e. an opening), a closed end 22, and a channel 24 that connects the open end 20 to the closed end 22. The closed end 22 of each of the pitot tubes 18 is coupled to a respective pressure sensor 26 (e.g. a manometer) of the pressure measuring apparatus 10.

In this embodiment, each pitot tube 18 extends from the internal wall of the conduit 4 in a direction that is perpendicular to a longitudinal axis of the conduit 4 and comprises a right-angle bend such that an opening 20 of that pitot tube 18 points in opposition to the flow 16 of a fluid in the conduit 4. In other words, the pitot tubes 18 are arranged such that they are perpendicular to the flow 16 of fluid in the conduit 4 and each pitot tube 18 comprises a short right-angled bend so that the openings 20 of the pitot tubes 18 are directed upstream, i.e. set parallel to the direction of fluid-stream movement 16.

In this embodiment, the open ends 20 of the pitot tubes 18 are equally spaced apart along the length of the conduit 4. However, in other embodiments, the open ends 20 of the pitot tubes 18 are not equally spaced apart.

In this embodiment, whereas open ends 20 of the pitot tubes 18 are relatively spaced apart (i.e. the distance between the open ends 20 is relatively large) along the length of the conduit 4, the closed ends 22 of the pitot tubes 18 are relatively close together (i.e. the distances between the closed ends 22 is relatively small compared to those between the open ends 20). Thus, in this embodiment, the closed ends 22 of the channels 24 are located proximate to one another such that the distance between the closed ends 22 of any two channels 24 is smaller than the distance between the open ends 20 of those two channels 24.

In other words, the closed ends 22 of the pitot tubes 18 are located proximate to one another, e.g., co-located.

In this embodiment, at least part of each channel 24 is located within the wall of the conduit 4.

In this embodiment, for a plurality of the channels 24, at least part of each of those channels 24 runs longitudinally along the length of the conduit 4, through/within the conduit wall. In this embodiment, the "length of the conduit 4" is the direction along the conduit 4 from the first end 12 to the second end 14.

Thus, in this embodiment, for each of a plurality of the channels 24, a component of the direction in which part of that channel 24 travels points along the length of the conduit. In other words, for each of a plurality of the channels 24, the entirety of that channel 24 is not perpendicular to the length (or longitudinal axis) of the conduit wall.

In some embodiments, the parts of the channels 24 arranged longitudinally within the conduit wall (i.e. along the length of the conduit 4) are substantially parallel with a flow channel of the conduit. The parts of the channels 24 arranged longitudinally within the conduit wall may be aligned with a longitudinal axis of the conduit 4.

In operation, fluid flows into the channel 24 of each of the pitot tubes 18 via the open ends 20. The channels 24 of the pitot tubes 18 have no outlets and so the moving fluid is brought to rest (i.e. stagnates) within the channels 24. Each pressure sensor 26 is configured to measure the pressure of the fluid within a respective channel 24. Each pressure sensor 26 measures a stagnation pressure of the fluid at a point in the flow stream that is local to the open end 20 of the pitot tube 18 to which that pressure sensor 26 is coupled. Thus, in this embodiment, the pressure sensors 26 measure stagnation pressures at multiple spaced apart points along the length of the conduit 4.

In this embodiment, the pressure sensors 26 are each coupled to a common processor 28 which is configured to process the measurements made by the pressure sensors 26. The pressure sensors 26 and the processor 28 form the pressure measuring apparatus 10.

Advantageously, the pressure sensors 26 are located proximate to one another, e.g. co-located. This tends to facilitate access to the pressure sensors 26, e.g. by a human aircraft technician, for the purpose of inspection, repair, replacement etc. Advantageously, the conduit 4 may be designed such that, when installed onboard the aircraft 2, the pressure sensors 26 are located at or proximate to an aircraft access panel.

In this embodiment, the conduit 4 comprises multiple pitot tubes 18. However, in other embodiments, the conduit 4 may include one or more different types of pressure measurement device instead of or in addition to one or more of the pitot tubes 18.

For example, in some embodiments, a pitot tube 18 may be replaced by a pitot-static tube.

Figure 3:
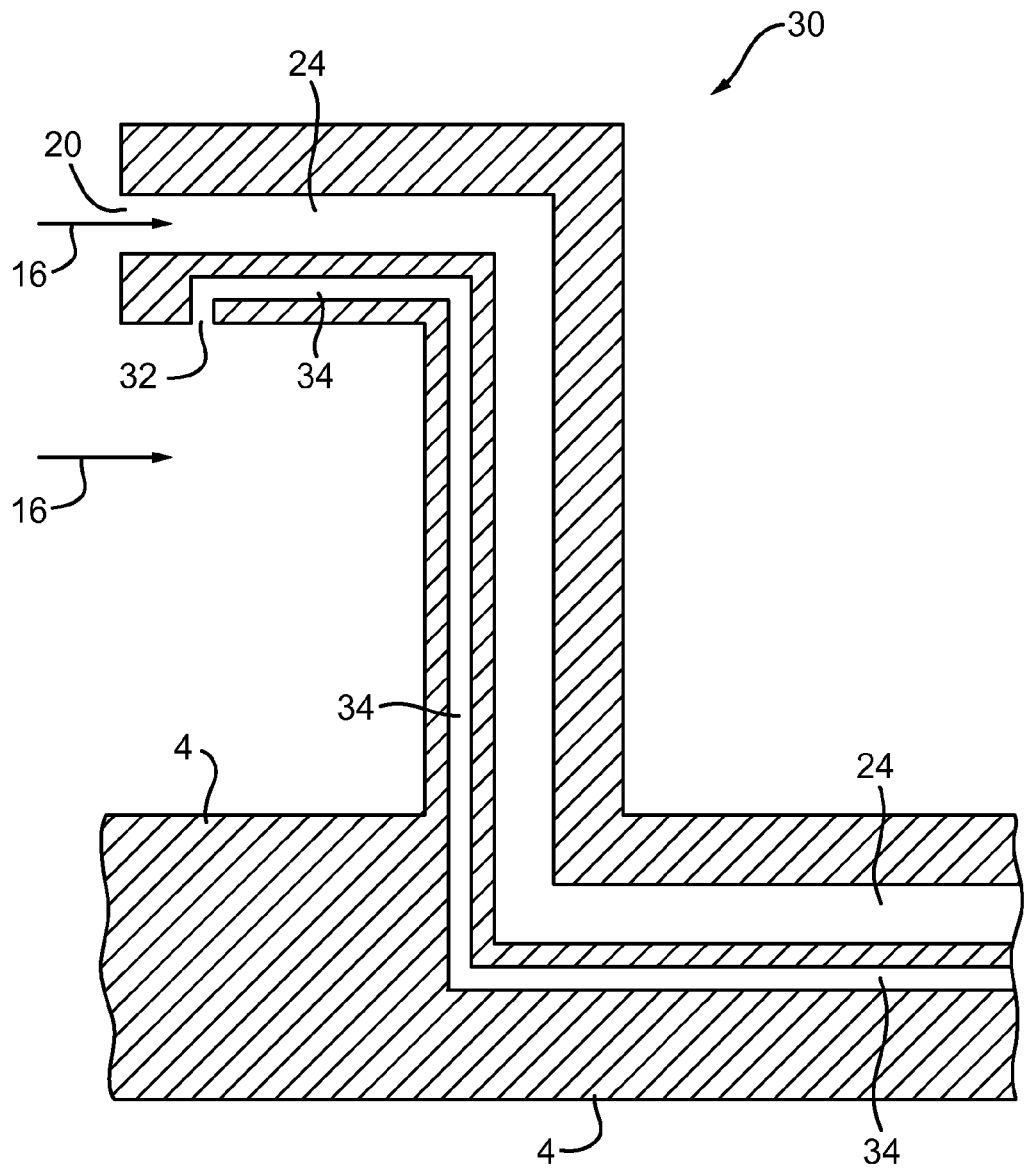
FIG. 3 is a schematic illustration (not to scale) showing an example of a pitot-static tube.

FIG. 3 is a schematic illustration (not to scale) showing an example of a pitot static tube 30 that may be included in some embodiments. Elements common to both the pitot tube 18 and the pitot-static tube 30 are indicated in the Figures by common reference numerals.

In addition to comprising an opening 20 communicating with a channel 24, the pitot-static tube 30 comprises a further opening 32 communicating with a further channel 34.

Similarly to the pitot tube 18, the pitot-static tube 30 extends from the wall of the conduit 4 in a direction that is perpendicular to a longitudinal axis of the conduit 4 and comprises a right-angle bend such that the opening 20 of that pitot-static tube 30 points in opposition to the fluid flow 16. A pressure sensor 24 (not shown in FIG. 3) is coupled to the closed end 22 of the channel 24 such that a stagnation pressure within the conduit 4 may be measured.

In this embodiment, the further opening 32 is a static port located on the pitot-static tube 30. The further opening 32 is located on the pitot-static tube 30 where it can access the fluid flow 16 in a relatively undisturbed area (for example, where disturbance to the fluid flow 16 is substantially minimal). A further pressure sensor (not shown in FIG. 3) is coupled to a closed end of the further channel 34 (which is opposite to the open end 32 of the further channel 34) such that a static pressure within the conduit 4 may be measured.

In this embodiment, at least part of the further channel 34 is located within the walls of the conduit 4 and may run alongside the channel 24. The further channel 34 may run longitudinally along the length of the conduit 4, through the conduit wall.

Also for example, in some embodiments, a pitot tube 18 may be replaced by a static tube or static source for measuring a static pressure within the conduit 4 only (and not a stagnation pressure).

What will now be described is an example process of producing the conduit 4.

Figure 4:
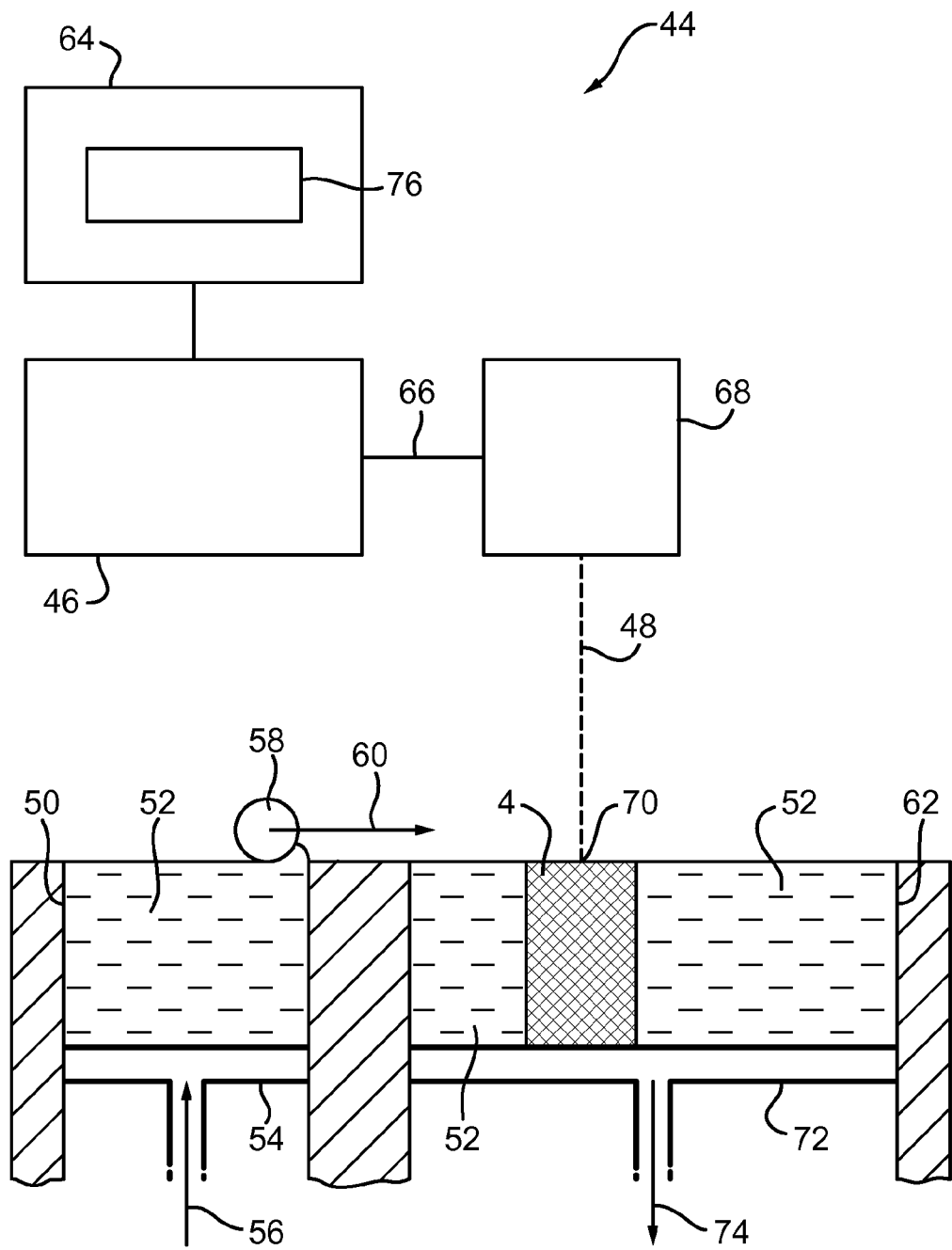
FIG. 4 is a schematic illustration (not to scale) showing example Additive Manufacturing apparatus.

FIG. 4 is a schematic illustration (not to scale) showing example Additive Manufacturing apparatus 44 that is used in an embodiment of a process of manufacturing the conduit 4.

In this embodiment, the AM apparatus 44 is apparatus for performing a powder bed AM processes. However, in other embodiments, a different type of AM apparatus is used produce the conduit 4, e.g. by performing a different type of AM process. Examples of AM processes that may be used in other embodiments include, but are not limited to, Material Extrusion processes, Material Jetting processes, Binder Jetting processes, Sheet lamination processes, Vat Photopolymerisation processes, Powder bed fusion processes, and Directed Energy Deposition processes.

In this embodiment, the AM apparatus 44 comprises a heat source in the form of a laser source 46 configured to produce a high powered laser beam 48. The laser source 46 may be any appropriate type of laser source, e.g. a laser source that is configured to have a continuous wave power output of 500 W.

The AM apparatus 44 further comprises a first powder repository 50 (or powder bed) containing an amount of metallic powder 52. The metallic powder 52 is a titanium alloy powder. In other embodiments, a different type of material (e.g. a ceramic powder or a different type of metallic power such as a steel powder, a nickel-based alloy powder, an aluminium alloy powder, or a copper powder) may be used.

In operation, a first piston 54 (that is located at the bottom of the first repository 50) is raised (in the direction indicated by an arrow in FIG. 4 and the reference numeral 56) so as to raise an amount of the powder 52 above a top level of the first repository 50. A roller 58 is then rolled (in the direction indicated by an arrow in FIG. 4 and the reference numeral 60) over the upper surface of the first repository 50 and across an upper surface of a second repository 62. This is performed so that the metallic powder 52 that was raised above the level of the first repository 50 by the raising of the first piston 54 is spread over an upper surface of the second repository 62. Thus, a top surface of the contents of the second repository 62 is covered by a layer of the metallic powder 52. In other embodiments, a different means of spreading the metallic powder 52 across a top surface of the contents of the second repository 62, such as a wiper, may be used instead of or in addition to the roller 58.

After a layer of the metallic powder 52 has been spread across a top surface of the contents of the second repository 62, the laser source 46 is controlled by a computer 64 to deliver the laser beam 48 via an optical fibre 66 to focussing optics 68. The focussing optics 68 focus the laser beam 48 to a focal point 70 on the layer of metallic power 22 that has been spread across a top surface of the contents of the second repository 62. The laser beam 48 melts a portion of the layer of metallic powder 52 onto which the laser beam 48 is focussed.

In this embodiment, the metallic powder 52 onto which the laser beam 48 is focussed is fully melted by the laser beam 48 and subsequently allowed to cool so as to form a layer of solid material. A second piston 72, located at the bottom of the second repository 62 is then lowered (i.e. moved in a direction indicated in FIG. 4 by a solid arrow and the reference numeral 74) to allow for a further layer of metallic powder 52 to be spread by the roller 18 across the top surface of the contents of the second repository 62 (and subsequently melted and allowed to solidify).

Many layers of material are laid on top of one another (in accordance with a digital design model 76 for the conduit 4 stored by the computer 64) to produce the conduit 4.

In this embodiment, the laser source 46 and focussing optics 68 are moveable under the control of the computer 64 in an X-Y plane that is parallel to the top surface of the contents of the second repository 62. Thus, the laser focal point 70 may be directed to any point in a working envelope in the X-Y plane so that layers of material of a desired shape may be deposited.

Thus, AM apparatus 44 for performing a process of producing the intermediate pipe 4 is provided.

FIG. 5 is a process flow chart showing certain steps of an embodiment of a process of producing the conduit 4 using the above described example AM apparatus 44.

At step s2, the digital design model 76 for the conduit 4 is specified and subsequently stored by the computer 64. In this embodiment, the digital model 76 can be viewed, manipulated and analysed using the computer 64 e.g. by implementing a suitable software package or tool.

At step s4, the AM apparatus 44 is calibrated. This calibration process may, for example, include, using the digital design model 76, determining a "tool path" that will be followed by the AM apparatus 44 when producing the conduit 4.

At step s6, using the AM apparatus 44, an AM process is performed to form the conduit 4. In this embodiment, the AM apparatus 44 performs a powder bed AM process which is described in more detail above with reference to FIG. 4. However, in other embodiments, a different type of AM apparatus and/or process is used produce the conduit 4.

In this embodiment, the AM process is performed in a substantially inert atmosphere (e.g. a chamber that is back-filled with an inert gas e.g. argon).

Thus, a process of producing the conduit 4 is provided. After being produced, the conduit 4 may be removed from the AM apparatus 44 and installed onboard the aircraft 2.

Advantageously, the conduit may be produced to have any desired shape and have any desired shaped cross section. For example, the conduit may be produced to have bends and curves as desired. In some embodiments, the conduit comprises a plurality of branches such that fluid flow may be split amongst a plurality of different paths. In some embodiments, the conduit comprises one or more valves for controlling fluid flow through the conduit. AM process, such as those described above, tend to be particularly well suited to manufacturing complex structures such as embodiments of the conduit that have relatively complex shapes and/or include one or more valves. Powder bed fusion AM processes (such as the one described in more detail above with reference to FIGS. 4 and 5) tend to be particularly well suited to manufacturing complex structures such as embodiments of the pipe that have relatively complex shapes and/or include one or more valves.

Advantageously, by using an AM process to produce the conduit, the conduit is a single object or item. In other words, the conduit is a single part component as opposed to a multipart component which may require further assembly. Thus, assembly time and costs tend to be reduced. Furthermore, this tends to provide that the mass of the conduit is less than that of conventional conduit, for example, because no bolts or other attachment means are used to attach together component parts. Thus, the size and weight of the conduit tends to be reduced. Thus, the above described conduit tends to be particularly beneficial when used on aircraft.

In the above embodiments, the conduit comprises a plurality of spaced apart pitot tubes for measuring stagnation pressure within the conduit. However, in other embodiments, the conduit comprises one or more static pressure ports instead of or in addition to one or more of the pitot tubes.

In the above embodiments, a pressure transducer is located at a closed end of each of the channels. However, in other embodiments, a different type of sensor is coupled to one or more of the channels instead of or in addition to a pressure transducer. For example, in some embodiments, a processor may be coupled to a closed end of a channel and thermocouple wires may run from the processor, along the channel, to the open end of the channel where a temperature sensor/probe is located and attached to the thermocouple wires. This advantageously allows for the temperature of the fluid within the conduit to be measured. Also for example, in some embodiments, a video monitoring device may be coupled to a closed end of a channel. Also, an optical fibre may run from the video monitoring device, along the channel, to the open end of the channel, thereby allowing for, for example, video monitoring of the operation of the conduit, e.g. functioning of valves etc.

In the above embodiments, the conduit is implemented onboard an aircraft. However, in other embodiments, the conduit is used on or in conjunction with one or more different entities instead of or in addition to an aircraft. For example, in some embodiments, the conduit is used onboard a different type of vehicle, such as a land-based or water-based vehicle.

In the above embodiments, the conduit is a tubular pipe. However, in other embodiments, the conduit may have a different shape.

In the above embodiments, each pitot tube comprises a single opening in communication with a respective channel from which a stagnation pressure may be measured. However, in other embodiments, each pitot tube may include a plurality of openings and respective channels, thereby providing that multiple independent measurements of stagnation pressure may be acquired. Likewise, a pitot-static tube may comprise multiple openings and respective channels for measuring stagnation and/or static pressures. Likewise, a static tube may comprise multiple openings and respective channels for measuring static pressures.

The invention claimed is:

1. A conduit comprising:
a conduit wall defining a flow channel through which a fluid may flow; and a plurality of further channels, each of the further channels being formed within the conduit wall; wherein
each further channel comprises a first end and a second end opposite to the first end;
for each further channel, the first end of that further channel comprises an opening in fluid communication with the flow channel of the conduit;
the first ends of the further channels are spaced apart along a length of the conduit;
the second ends of the further channels are located proximate to one another such that the distance between the second ends of any two further channels is smaller than the distance between the first ends of those two further channels, and
the conduit having been produced using an Additive Manufacturing process.

2. The conduit according to claim 1, wherein at least part of at least one further channel runs longitudinally within the conduit wall along at least part of the length of the conduit wall.

3. The conduit according to claim 2, wherein, for each of the plurality of further channels at least part of that further channel runs longitudinally within the conduit wall along at least part of the length of the conduit wall.

4. The conduit according to claim 1, wherein each part a further channel that runs longitudinally within the conduit wall along at least part of the length of the conduit wall is substantially parallel with the flow channel defined by the conduit wall.

5. The conduit according to claim 1, wherein the opening of one or more of the further channels is arranged such that, when a fluid flows through the flow channel of the conduit, that opening is directed upstream.

6. The conduit according to claim 1, wherein the opening of one or more of the further channels is arranged such that, when a fluid flows through the flow channel of the conduit, that opening is a static port in communication with the fluid in a relatively undisturbed area.

7. The conduit according to claim 1, wherein:
the conduit comprises one or more elongate portions extending from an internal surface of the conduit wall into the flow channel of the conduit; and
for each elongate portion, an opening of one or more of the further channels is located at or proximate to a distal end of that elongate portion.

8. The conduit according to claim 7, wherein at least one of the elongate members comprises at least two openings at or proximate to its distal end, a first of these openings being arranged such that, when a fluid flows through the flow channel of the conduit, that opening is directed upstream, and a second of these openings being arranged such that, when a fluid flows through the flow channel of the conduit, that opening is a static port in communication with the fluid in a relatively undisturbed area.

9. The conduit according to claim 1, wherein the second ends of the further channels are closed ends.

10. The conduit according to claim 1, wherein
the conduit further comprises a plurality of pressure sensors;
each pressure sensor is coupled to a respective further channel at the second end of that further channel; and
each pressure sensor is configured to measure a pressure in the further channel to which that pressure sensor is coupled.

11. The conduit according to claim 1, wherein the second ends of the further channels are substantially co-located.

12. The conduit according to claim 1, wherein each of the further channels is wholly within the conduit wall.

13. The conduit according to claim 1, the conduit being a single item.

14. An aircraft comprising:
a first aircraft system;
a second aircraft system; and
a conduit according to claim 1; wherein
the conduit couples the first aircraft system to the second aircraft system such that a fluid may be caused to flow from the first aircraft system to the second aircraft system through the flow channel of the conduit.

15. A method of measuring fluid pressure comprising:
providing a first system;
providing a second system;
coupling a conduit according to claim 1 between the first system and the second system causing a fluid to flow through the flow channel of the conduit from the first system to the second system; and
measuring a pressure within one or more of the further channels.

16. The method according to claim 15, in which the first and second systems are aircraft systems located on board an aircraft.

17. The method of producing a conduit according to claim 1, the method comprising producing a digital model of the conduit, and, using the digital model of the conduit, controlling an Additive Manufacturing apparatus to perform the Additive Manufacturing process to produce the conduit as specified by the digital model.

* * * * *